United States Patent
Stock

(10) Patent No.: US 9,420,060 B2
(45) Date of Patent: Aug. 16, 2016

(54) COLLABORATIVE EXPERTISE NETWORKING SYSTEM AND METHOD

(71) Applicant: Talent Earth, Inc., Folsom, CA (US)

(72) Inventor: Robert John Stock, Folsom, CA (US)

(73) Assignee: TALENT EARTH, INC., Folsom, CA (US)

( * ) Notice: Subject to any disclaimer, the term of this patent is extended or adjusted under 35 U.S.C. 154(b) by 249 days.

(21) Appl. No.: 13/749,686

(22) Filed: Jan. 25, 2013

(65) Prior Publication Data

US 2013/0346507 A1 Dec. 26, 2013

Related U.S. Application Data

(60) Provisional application No. 61/593,228, filed on Jan. 31, 2012.

(51) Int. Cl.
*H04L 29/08* (2006.01)
*G06Q 50/00* (2012.01)
*G06Q 10/10* (2012.01)

(52) U.S. Cl.
CPC ............ *H04L 67/306* (2013.01); *G06Q 10/105* (2013.01); *G06Q 50/01* (2013.01)

(58) Field of Classification Search
CPC ..... H04L 67/306; G06Q 10/105; G06Q 50/01
USPC .................. 707/755, 794; 709/205, 206, 250; 705/7.38–7.42
See application file for complete search history.

(56) References Cited

U.S. PATENT DOCUMENTS

| | | | |
|---|---|---|---|
| 2003/0200142 A1* | 10/2003 | Hicks et al. | 705/14 |
| 2004/0088177 A1* | 5/2004 | Travis et al. | 705/1 |
| 2005/0021872 A1* | 1/2005 | Poustchi et al. | 709/250 |
| 2006/0031109 A1* | 2/2006 | LaRue et al. | 705/9 |
| 2007/0088601 A1* | 4/2007 | Money et al. | 705/10 |
| 2011/0023096 A1* | 1/2011 | Xiao et al. | 726/5 |
| 2012/0110087 A1* | 5/2012 | Culver et al. | 709/205 |
| 2012/0197809 A1* | 8/2012 | Earl et al. | 705/301 |
| 2013/0290448 A1* | 10/2013 | Work et al. | 709/206 |

* cited by examiner

*Primary Examiner* — Brian J Gillis
*Assistant Examiner* — Javier O Guzman
(74) *Attorney, Agent, or Firm* — K&L Gates LLP

(57) ABSTRACT

Embodiments are directed to an apparatus or method that includes among other features, a search engine configured to permit a user to search the profiles of other users, a storage medium configured to store the profile of the users such that the profiles include at least one of text, picture, audio and video, wherein the profile displays tasks that were performed by the user in the past and a team creation module configured to form a team of a group of users such that a skill for performing a task associated with the group of users is generated based on the combined skill of the group of users.

9 Claims, 1 Drawing Sheet

COLLABORATIVE EXPERTISE NETWORKING SYSTEM AND METHOD

SUMMARY

Embodiments are directed to an apparatus or method that includes among other features, a search engine configured to permit a user to search the profiles of other users, a storage medium configured to store the profile of the users such that the profiles include at least one of text, picture, audio and video, wherein the profile displays tasks that were performed by the user in the past and a team creation module configured to form a team of a group of users such that a skill for performing a task associated with the group of users is generated based on the combined skill of the group of users.

Embodiments include a method or system for creating a team of user that includes, creating, using a team creation module, a group of users, wherein each user that is a member of the group of users has at least one skill that is contributed to the group of users and generating a profile that aggregates the shared skills of each user to form a skill of the group of users.

BRIEF DESCRIPTION OF THE DRAWINGS

FIG. 1 is a display that may be generated by an embodiment of the system and method described above.

Various other figures are also attached below.

DETAILED DESCRIPTION OF THE PREFERRED EMBODIMENTS

Embodiments are directed to a tool that changes the way people find work. Instead of applying for jobs, the tools shows employers who is the person. Aspects are directed to providing a "Supermarket of Talent" and provides businesses and entrepreneurs a way to browse and search through a plurality of visual and textual based media profiles to find the exact individual or groups of individuals they need to get the job done.

Aspect are directed to providing a search that permits a person to search for other individual or individuals and invite them to form a user created team. These user created teams may allow people to merge their skills together and offer their services as a collaborative group for businesses to hire the entire team.

A user may create a multidimensional resume that includes a welcome video, video library of your skills, photo library of your skills, document library that highlights your skills, graphics and/or illustration library that highlights your skills, links to web articles and/or pages that highlight the users' skills and/or achievements and a live reference module that allows the user to gather references from various people that can speak to the user's abilities and/or talent.

The live reference module is unique with its ability for you, the user may send a reference request from the website—requesting a previous employer or coworker for a reference. This recipient will get an email or other forms of communication from the website asking for a specific reference, with a link back to the website where their recommendation or reference can be entered and directly embedded into the profile or resume of the requester.

Aspect of the website may provide the user the ability to add other colleagues to their contact listing and then have the ability to reach out and message the entire list or simply select who they wish to send a message to. The user will also be able to send requests to other members to have them join your team.

The profile page will provide a user tools to monitor the "Messages", "Requests", "Contacts", "Talents" and "Teams" that you have added to your profile or interactions that are taking place on your profile. The user will also be able to track "Current Jobs you have accepted", "Jobs and/or projects the user are watching", "Upcoming Dates and Tasks" and "Possible Job Connections".

Aspect of the website will allow businesses and entrepreneurs to join as a "Business members" and providing them the tools to "Post Jobs", "Post Projects" and allow individuals to "Inquire" or "Add" the business member to their watch list. They will be able to hire individuals or hire "Teams" that have been created on the site.

Feature of the website allow individuals to join the website and to form their own company within our online community. This feature will allow the users to invite various other users to join or form their own company. Once a user joins a company, the user's portfolio or portions of the user's portfolio will be added to the company's page allowing them to market the user's talent to others companies, users or customers. Removing a user's profile and/or name from the company's online community website will eliminate the user from the company website and will not permit others to communicate directly with a user without the company or trying to reach out to the user directly.

The above references features allow thousands of strong sales individuals who wish to build a business by marketing other individuals' talent. Alternatively, other users that are not strong at marketing themselves may associate themselves with other businesses or users that will go out and sell and/or market the user or the user's skills to others. The business in the online community may profit by offering talent from smaller markets into larger market centers for a higher rate value and by combining a set of user's with varying backgrounds together to make a stronger offering.

Embodiments of the method or apparatus allows individuals share information about them that allows other users to see who they are by building and adding the rich-media content to their profile(s). Media rich may include text, photos, videos or the like. Companies and entrepreneurs will be able to Join the online community as a business member and to share with the individuals details regarding their goals, culture and other information.

Talent Earth is simply a "Show Me Site" vs. "Tell Me Site" and allows anyone to quickly paint a picture of who they are and how they can be used for upcoming projects or jobs.

Embodiments may be provided for free to some or all users and the user's may data into a pre-set limited amount of space to store their profile videos, photos, documents, etc. There may be a second tier of access that offers other users, to have unlimited skills and upload a larger preset-limited amount of space. For example, the space may be 5 GB of space in addition to the free users and will give the users the ability to build and/or join teams and collaborate with other users.

Another type of user may be a business, which may provide businesses with the ability to upload jobs and projects. The business members will be able to respond to users by choosing from a list of pre-written response letters that are stored or uploaded to their letter and/or response queue. The companies will also be able track and assign all projects that are started with various users.

Various advantages may be realized by the system and method described above, individuals are provided with the ability to upload and show videos, photos, skills text to potential employers or other individuals. The system and method described above provides businesses a way to shop for a user's skills similar to the way someone shops at a grocery store for food. A user's skills will be on display "showcased" in a multi-dimensional fashion that allows people and businesses to browse and look through the user's abilities.

May people currently work at jobs to pay their bills or pay for healthcare. The embodiments of the system or method discussed above allows these user achieve their monitory goals while allowing them to highlight what they truly enjoy doing as well or allow them to utilize their true core abilities. Accordingly an individual may be able to supplement their income or change careers all together.

Embodiments of the system and methods described above allow users and businesses to determine what skills or experience other individuals have without having to review a document alone. Embodiments allow individuals to be evaluated based on the tasks the user has performed in the past instead on first impressions during an interview.

Brief Description of the Platform

Embodiments are directed to a job listing website stored on a non-transitory computer storage medium, the website provides a visual resume creation and management system to represent the skills and experience of registered members who are seeking employment. The website allows employers to list and manage their available jobs. The website may permit social networking features; such as posting and sharing messages and statuses, use rich media to support user profiles and especially to find, create and network with virtual teams on the site. The website provides a rich display of individuals' skills and talents, it is also to be searchable and marketable by their key attributes and provides a unique and appealing web platform.

User registration process may include various items such as, Faceback® and LinkedIn® sign-in integration, unique custom URLs per user, user homepage and business homepage, user and/or business profile page creation and management, talent, profile, team and jobs management, messaging, rich media management, dates and/or tasks calendar, applications settings, search talents and/or skills, filtered search, limited search for non-logged in users, kharma points system, e-Commerce integration, tools content management.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus, comprising:
a memory and one or more processors communicatively coupled to the memory; and a search engine, a non-transitory storage medium, a team creation module, a points system module, and a display module, each stored on the memory and executable by the one or more processors;

the search engine configured to permit a user to search the profiles of other users;

the non-transitory storage medium configured to store the profile of the users such that the profiles include at least one of text, picture, audio and video, wherein the profile displays tasks that were performed by the user in the past;

the team creation module configured to form a team of a group of the users such that a skill for performing a team task associated with the team is generated based on the combined skill of the users in the team, the team task being offered by an employer entity that hires the team to complete the task;

the points system module configured to:

reward each user in the team a completion award after the team completes the team task;

facilitate, for each user in the team, one or more peer performance reviews by enabling each user in the team to rate the performance of each other user in the team based on completion of the team task;

facilitate one or more employer performance reviews by enabling the employer entity to rate the performance of each user in the team based on completion of the team task;

facilitate, for each user in the team, an employer review by enabling each user in the team to rate the performance of the employer entity based on completion of the team task;

rank the team among a plurality of teams based on a first composite score based at least in part on the completion award, the one or more peer performance reviews and the one or more employer performance reviews; and rank the employer entity among a plurality of employer entities based on a second composite score based at least in part on each employer review from each user in the team; and the display module configured to cause, in a device, display of: a profile of the team, the completion award for each user in the team, the one or more peer performance reviews, the one or more employer performance reviews, the employer review, the ranking of the team among the plurality of teams, and the ranking of the employer entity among the plurality of employer entities.

2. The apparatus of claim 1, wherein the combined skill of the users in the team is an aggregation of the skill of performing a task of each user in the users in the team.

3. A method comprising:

creating, using a team creation module, a team comprising a group of users, wherein each user has at least one skill that is contributed to the team;

generating a profile that aggregates the shared skills of each user to form a skill of the team;

transmitting to the team, using the team creation module, a team task being offered by an employer entity that hires the team to complete the task, the team task to be completed by the team using the aggregated shared skills;

assigning to each user in the team, using a points system module, a completion award after the team completes the team task;

facilitating, for each user in the team, using the points system module, one or more peer performance reviews by enabling each user in the team to rate the performance of each other user in the team based on completion of the team task;

facilitating, using the points system module, one or more employer performance reviews by enabling the employer entity to rate the performance of each user in the team based on completion of the team task;

facilitating, for each user in the team, using the points system module, an employer review by enabling each user in the team to rate the performance of the employer entity based on completion of the team task;

ranking, using the points system module, the team among a plurality of teams based on a first composite score based at least in part on the completion award, the one or more peer performance reviews and the one or more employer performance reviews;

ranking, using the points system module, the employer entity among a plurality of employer entities based on a second composite score based at least in part on each employer review from each user in the team; and causing display of: the profile of the team, the completion award for each user in the team, the one or more peer performance reviews, the one or more employer performance reviews, the employer review, the ranking of the team among the plurality of teams, and the ranking of the employer entity among the plurality of employer entities, in a device using a display module.

4. The apparatus of claim 1, wherein the team creation module is further configured to host an online interview between each user in the team and the employer entity.

5. The apparatus of claim 1, wherein the team creation module is further configured to:

receive a search query specifying a designated skill and a geographic region; and output search results specifying one or more users having the designated skill and residing within the geographic area; and wherein the display module is further configured to cause display, in the device, of the search results and the geographic area.

6. The apparatus of claim 1, wherein the team creation module is further configured to:

receive a request for help with the team task from the employer entity; and receive a response to the request for help from the team; and wherein the display module is further configured to cause display, in the device, of the request for help.

7. The method of claim 3, further comprising hosting an online interview between each user in the team and the employer entity.

8. The method of claim 3, further comprising:

receiving a search query specifying a designated skill and a geographic region;

outputting search results specifying one or more users having the designated skill and residing within the geographic area; and causing display, in the device, of the search results and the geographic area.

9. The method of claim 3, further comprising:

receiving a request for help with the team task from the employer entity;

receiving a response to the request for help from the team; and causing display, in the device, of the request for help.

* * * * *